(12) United States Patent
Huguenin et al.

(10) Patent No.: US 11,106,337 B2
(45) Date of Patent: Aug. 31, 2021

(54) ADAPTATION OF USER INTERFACES BASED ON A FRUSTRATION INDEX

(71) Applicant: SAP SE, Walldorf (DE)

(72) Inventors: Marc Huguenin, Palo Alto, CA (US); Congyun Luo, Palo Alto, CA (US); Dinesh Kumar, Palo Alto, CA (US); Linda Lizarraga, Palo Alto, CA (US)

(73) Assignee: SAP SE, Walldorf (DE)

( * ) Notice: Subject to any disclaimer, the term of this patent is extended or adjusted under 35 U.S.C. 154(b) by 621 days.

(21) Appl. No.: 15/068,333

(22) Filed: Mar. 11, 2016

(65) Prior Publication Data

US 2017/0262147 A1  Sep. 14, 2017

(51) Int. Cl.

| | |
|---|---|
| *G06F 3/00* | (2006.01) |
| *G06F 3/0484* | (2013.01) |
| *H04L 29/08* | (2006.01) |
| *G06F 3/01* | (2006.01) |
| *G06F 9/451* | (2018.01) |
| *G06F 8/38* | (2018.01) |

(52) U.S. Cl.
CPC .............. *G06F 3/0484* (2013.01); *G06F 3/01* (2013.01); *G06F 8/38* (2013.01); *G06F 9/451* (2018.02); *H04L 67/02* (2013.01); *G06F 2203/011* (2013.01)

(58) Field of Classification Search
CPC .. G06F 3/0484; G06F 3/0481; G06F 3/04812; G06F 9/451; G06F 3/01; G06F 8/38; G06F 2203/011; H04L 67/02
See application file for complete search history.

(56) References Cited

U.S. PATENT DOCUMENTS

| | | | | |
|---|---|---|---|---|
| 6,452,617 | B1 * | 9/2002 | Bates ....................... | G06F 3/038 715/744 |
| 7,299,409 | B2 * | 11/2007 | Joshi ....................... | H04L 29/06 715/234 |
| 7,363,282 | B2 * | 4/2008 | Karnawat ......... | G06F 17/30867 706/45 |
| 8,539,342 | B1 * | 9/2013 | Lewis .................... | G06F 17/212 715/243 |
| 9,710,829 | B1 * | 7/2017 | Sitapara ............. | G06Q 30/0276 |
| 10,313,211 | B1 * | 6/2019 | Rastogi ................. | H04L 43/065 |
| 2002/0054104 | A1 * | 5/2002 | Berczik ................. | G06F 9/5011 715/764 |
| 2006/0259861 | A1 * | 11/2006 | Watson ................. | G06F 16/951 715/705 |

(Continued)

*Primary Examiner* — Kieu D Vu
*Assistant Examiner* — Andrew Chung
(74) *Attorney, Agent, or Firm* — Mintz Levin Cohn Ferris Glovsky and Popeo, P.C.

(57) ABSTRACT

Methods and apparatus, including computer program products, are provided for adapting user interfaces. In one aspect, there is provided a method. The method may include monitoring at least one action at a user interface including a page to enable a determination of a response time representative of an amount of time for an application to respond to the at least one action at the user interface including the page; determining, based on at least the response time, a frustration index; and adapting, based on the determined frustration index, at least a portion of the user interface including the page. Related apparatus, systems, methods, and articles are also described.

21 Claims, 8 Drawing Sheets

(56) References Cited

U.S. PATENT DOCUMENTS

| | | | | |
|---|---|---|---|---|
| 2007/0244739 A1* | 10/2007 | Soito | ................. | G06Q 30/0201 |
| | | | | 705/7.29 |
| 2007/0266311 A1* | 11/2007 | Westphal | .......... | G06F 17/30873 |
| | | | | 715/700 |
| 2008/0215976 A1* | 9/2008 | Bierner | ................. | G06F 40/174 |
| | | | | 715/708 |
| 2009/0138856 A1* | 5/2009 | Oja | .................... | G06F 11/3612 |
| | | | | 717/126 |
| 2009/0216592 A1* | 8/2009 | Zhang | .................... | G06Q 30/02 |
| | | | | 705/14.12 |
| 2009/0248594 A1* | 10/2009 | Castleman | .............. | G06F 9/453 |
| | | | | 706/11 |
| 2010/0180230 A1* | 7/2010 | Bogner | ................. | G06F 3/0481 |
| | | | | 715/810 |
| 2010/0223578 A1* | 9/2010 | Huberman | .............. | G06Q 99/00 |
| | | | | 715/810 |
| 2010/0257185 A1* | 10/2010 | Dvir | .................... | G06F 11/0715 |
| | | | | 707/748 |
| 2011/0283189 A1* | 11/2011 | McCarty | ............ | H04N 5/44543 |
| | | | | 715/707 |
| 2012/0030030 A1* | 2/2012 | Flinn | ...................... | G06Q 10/06 |
| | | | | 705/14.66 |
| 2012/0166636 A1* | 6/2012 | Page | .................... | G06F 11/3409 |
| | | | | 709/224 |
| 2012/0226993 A1* | 9/2012 | Bromer | .................... | G06F 3/011 |
| | | | | 715/744 |
| 2013/0031470 A1* | 1/2013 | Daly, Jr. | ............ | G06F 17/30867 |
| | | | | 715/243 |
| 2013/0080910 A1* | 3/2013 | Bingell | ................... | G06F 3/048 |
| | | | | 715/744 |
| 2013/0111031 A1* | 5/2013 | Hoffmann | ............... | G06F 9/505 |
| | | | | 709/226 |
| 2013/0212487 A1* | 8/2013 | Cote | ....................... | G06F 9/451 |
| | | | | 715/745 |
| 2014/0173474 A1* | 6/2014 | Klemenz | ................. | G06F 9/453 |
| | | | | 715/765 |
| 2014/0331130 A1* | 11/2014 | Belisle | ................... | G06F 3/0482 |
| | | | | 715/705 |
| 2015/0074224 A1* | 3/2015 | Kleinhout | ............... | H04L 67/22 |
| | | | | 709/217 |
| 2015/0161083 A1* | 6/2015 | Ding | ................... | H04L 43/0876 |
| | | | | 715/205 |
| 2016/0092085 A1* | 3/2016 | Kitner | ................... | G06F 3/0488 |
| | | | | 715/738 |
| 2016/0180352 A1* | 6/2016 | Chen | .................. | G06Q 30/0201 |
| | | | | 705/7.29 |

* cited by examiner

ADAPTATION OF USER INTERFACES BASED ON A FRUSTRATION INDEX

FIELD

The present disclosure generally relates to data processing and, in particular, cloud, or web, based applications including user interfaces.

BACKGROUND

A server-based application, such as cloud-based application, may enable one or more user equipment to interact with the application. For example, the user equipment, such as a computer, a tablet, a smart phone, or other processor-based device, may present a user interface, such as a page, through which the user interface or page can interact with the cloud-based application by allowing selections to be made via a drop down menu, data entry field, and/or other actions. These actions performed at the user interface are provided to the cloud based application, which may then generate a response. To illustrate further, the page may be part of a workflow or process associated with a task or function such as processing of a purchase order or other activity. And, as part of completing the purchase order, a user may perform an action at the user interface (for example, entering the supplier name). In response, the cloud-based application may query a database for the supplier name and then return to the user interface, information about the supplier for presentation at the page.

SUMMARY

In one aspect there is provided a method. The method may include monitoring at least one action at a user interface including a page to enable a determination of a response time representative of an amount of time for an application to respond to the at least one action at the user interface including the page; determining, based on at least the response time, a frustration index; and adapting, based on the determined frustration index, at least a portion of the user interface including the page.

In some implementations, the above-noted aspects may further include additional features described herein including one or more of the following. The page may be presented at a user equipment which accesses via a network the application hosted by at least one server. A click monitor at the at least one server may monitor the at least one action. The at least one action may be logged with an associated response time. The response time may be determined based on a timer that is triggered when the at least one action is received by the click monitor. The frustration index may be determined based on the response time relative to a target response time. The frustration index may be determined based on the response time relative to a target response time and a maximum response time. The adapting may include changing a location of the at least a portion of the user interface. The adapting may include providing help information at the page. Another frustration index may be determined for the at least the portion of the user interface including the page. When the other frustration index indicates an improvement over the frustration index, the at least the portion of the user interface including the page may be continued to be used. The at least one action may include a click. The frustration index may be determined over a plurality of actions. An application health index may be determined based on the frustration index.

It is to be understood that both the foregoing general description and the following detailed description are exemplary and explanatory only and are not restrictive. Further features and/or variations may be provided in addition to those set forth herein. For example, the implementations described herein may be directed to various combinations and sub-combinations of the disclosed features and/or combinations and sub-combinations of several further features disclosed below in the detailed description.

DETAILED DESCRIPTION

As noted above, cloud applications are becoming increasingly popular for a variety of reasons. However, the very nature of cloud-based applications can from time-to-time, make them susceptible to longer than desired response times from the cloud application, which may cause a frustrating user experience. Referring again to the purchase order example described above, if the time associated with requesting the supplier and obtaining a response from the cloud application is too long relative to a target response time, the user of the user equipment presenting the page will likely get frustrated.

In some example embodiments, there is provided a way to determine a frustration index associated with an element of the page presented at a user equipment. The frustration index may be determined based on how long it takes the cloud-based application to respond to an action (for example, a click requesting something from the cloud-based application) at the user interface including the page. In some example embodiments, the frustration index may be used to adapt an element or other aspect of a page presented at a user equipment to reduce the frustration index.

Figure 1:
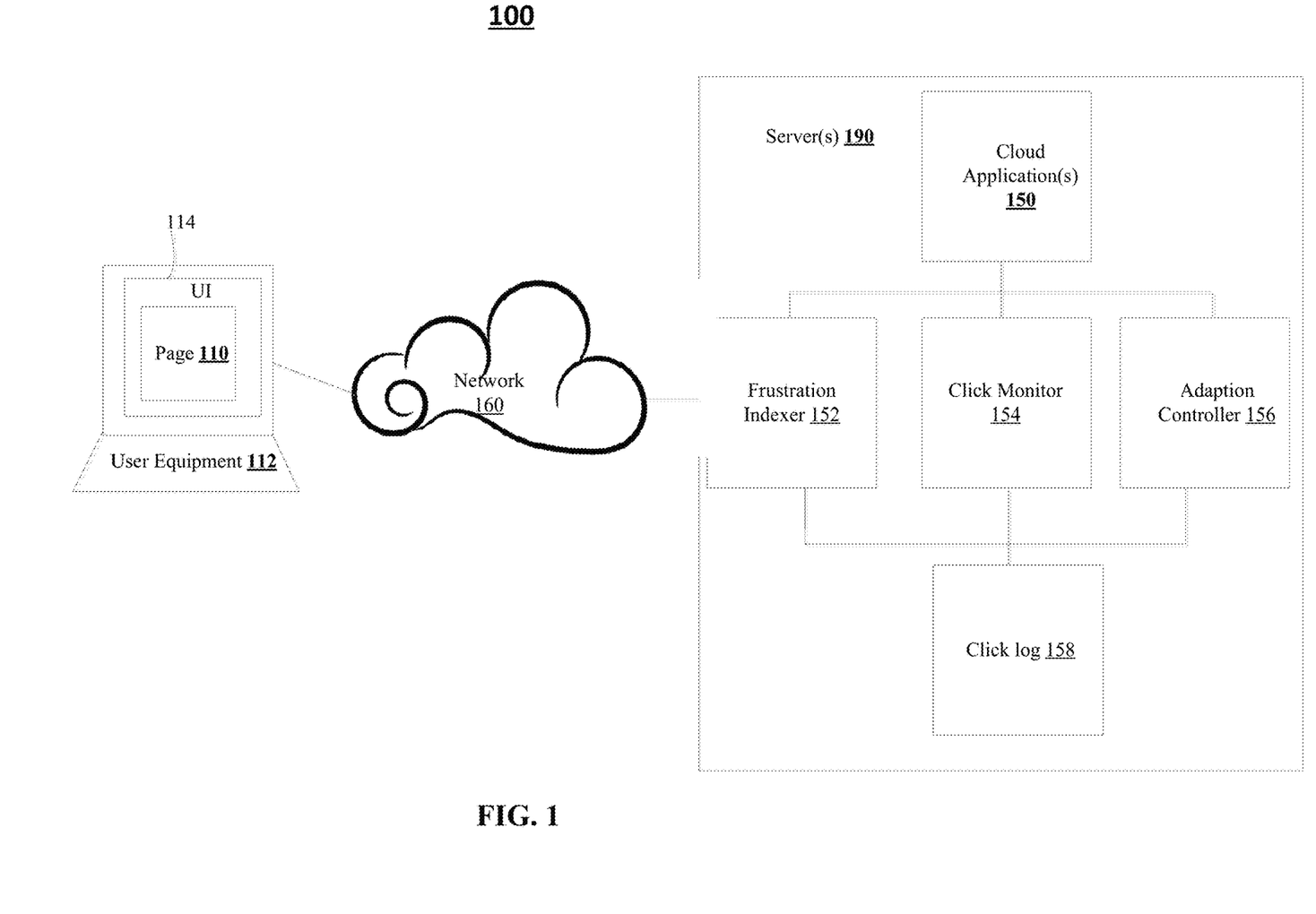
FIG. 1 depicts an example of a system for user interface adaptation, in accordance with some example embodiments.

FIG. 1 depicts an example system 100, in accordance with some example embodiments.

The system 100 may include a user equipment 112, such as a tablet, a computer, a smartphone, and/or any other device including at least one processor and at least one memory including program code. The user equipment 112 may include a user interface 114, such as a browser, a client application, and/or the like, configured to interact with a cloud application 150 via network 160 (for example, a wired network, a wireless network, a cellular network, the Intranet, and/or any other network or link).

In the example of FIG. 1, the user interface 114 may present a page 110. The page 110 may comprise one or more elements, such as drop down menus, data entry fields, and/or other elements where an action can be performed. These elements at page 110 may allow interaction with the cloud application 150.

Figure 2:
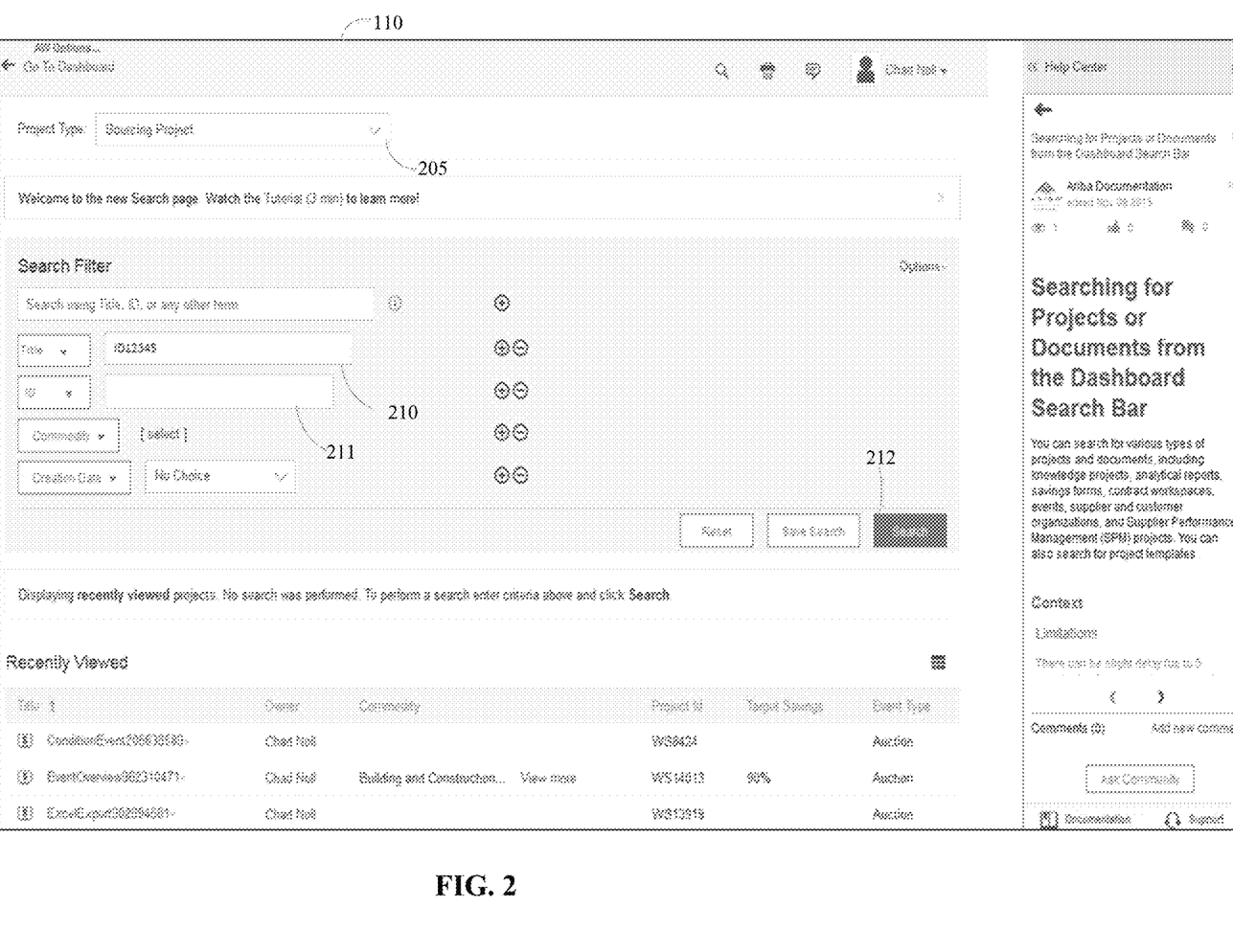
FIG. 2 depicts an example of a user interface including a page, in accordance with some example embodiments.

FIG. 2 depicts an example of a page 110 including elements such as a drop down element 205, a title entry field 210 where a query can be performed, an ID entry field 211 where a query can be performed, and a search selector 212. In this example, entry of an "ID12345" at title entry field 210 and clicking search 212 triggers the page 110 to send a search request to application 150 to search for "ID12345." The application 150 may then respond with a search result for presentation at page 110 or another page. The page may then be presented at a display of the user equipment 112.

Referring again to FIG. 1, the cloud application 150 may include one or more applications hosted at one or more servers 190. The server 190 may comprise at least one processor and at least one memory including program code configured to provide the functions described herein with respect to server 190 including cloud application 150 and the like.

In some example embodiments, the cloud application 150 may be associated with a click monitor 154. The click monitor 154 may monitor interactions between page 110 and cloud application 150. For example, each action at page 110 may trigger a corresponding action, such as a message or a request, to be sent to the cloud application 150. Each of the actions at page 110 can be considered a click (for example, a selection or other action at the user interface that triggers a corresponding action to be sent to the cloud application 150). A click can be any type of action performed by a user that causes a server response. Examples of clicks include clicking or selecting a button or icon on a user interface, selecting a value from a drop down list at a user interface, selecting or clicking on a hyperlink at a user interface, and/or the like. To illustrate further, in the case of a catalog search, as a user types in a search criteria, the search results can be modified as each search character is being entered. In this example, the entry of each character can be considered a click. In any case, the click(s) can be monitored by the click monitor 154.

Referring again to FIG. 2, when the search 212 is clicked (for example, selected), this triggers page 110 to send a query request to application 150 to search for "ID12345." In this example, click monitor 154 may determine an amount of time it takes the cloud application 150 to generate a response to the request. Specifically, a timer associated with the field "ID12345" 210 or search 212 may be started as soon as the search is clicked at 212 (or as soon as it is received at server 190 or click monitor 154), and that timer can be stopped when a response is sent by cloud application 150 to page 110. In some example embodiments, each element, such as elements 210, 211, and 212, may have a timer that is triggered when an action is performed at the element at page 110 that requires information or other response from the cloud application. The amount of time associated with the response can be stored at click log 158 (for example, as a record or a row in a log or a database). The click monitor 154 may also record other metadata associated with that click 212. For example, the click monitor 154 may record every user action (click) including what the user was doing, how long the action took, where in the application the time was spent such as database query, catalog search, and/or the like.

In some example embodiments, the server 190 may also include a frustration indexer 152. For each element associated with a page, the frustration indexer 152 may determine a frustration index based on at least an amount of time (for, example, response time) monitored by the click monitor 154 and stored at log 158. For any given click or action at a page 110, the frustration indexer 152 may determine a relative of amount of frustration experienced by a user of page 110. In some example embodiments, the frustration indexer 152 may generate the frustration index for a given element at page 110 based on a comparison to a predetermined, target response time. For example, the target response can be initially set to a value that represents the $90^{th}$ percentile with respect to response time for a given page, wherein the $90^{th}$ percentile is determined over a sample set of for example one month of historical data, although this initial value may be adjusted or varied to other values as well.

In some example embodiments, the frustration indexer 152 may determine in a linear manner the frustration index as a function of response time, rT. For example, if the response time monitored by click monitor 154 and stored at log 158 is less than a predetermined target response time, $TR,(p)$, then the frustration index, $F(p,rT)$, may be set to a predetermined value, such as zero, indicating no frustration in this example. In some implementations, the frustration index, $F(p,rT)$, may be determined in accordance with the following:

If $rT<=TR(p)$

Then $F(p,rT)=0$        Equation 1.

If the response time monitored by click monitor 154 and stored at log 158 is above the target response time $TR,(p)$, but below a predetermined maximum response time, $MR(p)$, the frustration index, $F(p,rT)$, may correspond to some frustration on the part of the user. In some implementations, the maximum response time is set by obtaining the $90^{th}$ percentile of the maximum page response time for users who logged out or ended their session after executing the page. As such, the frustration index, $F(p,rt)$ may be determined in a linear manner according to the following:

If $rT>TR(p)$ and $<MR(p)$

Then $F(p,rT)=(1/TR(p))*rT-1$      Equation 2.

If the response time monitored by click monitor 154 and stored at log 158 is above the maximum response time, $MR(p)$, the frustration indexer 152 may cap or normalize the frustration level experienced by the user to a predetermined maximum value in accordance with the following:

If $rT>=MR(p)$

Then $F(p,rT)=MR(p)/TR(p)-1$      Equation 3.

Figure 3A:
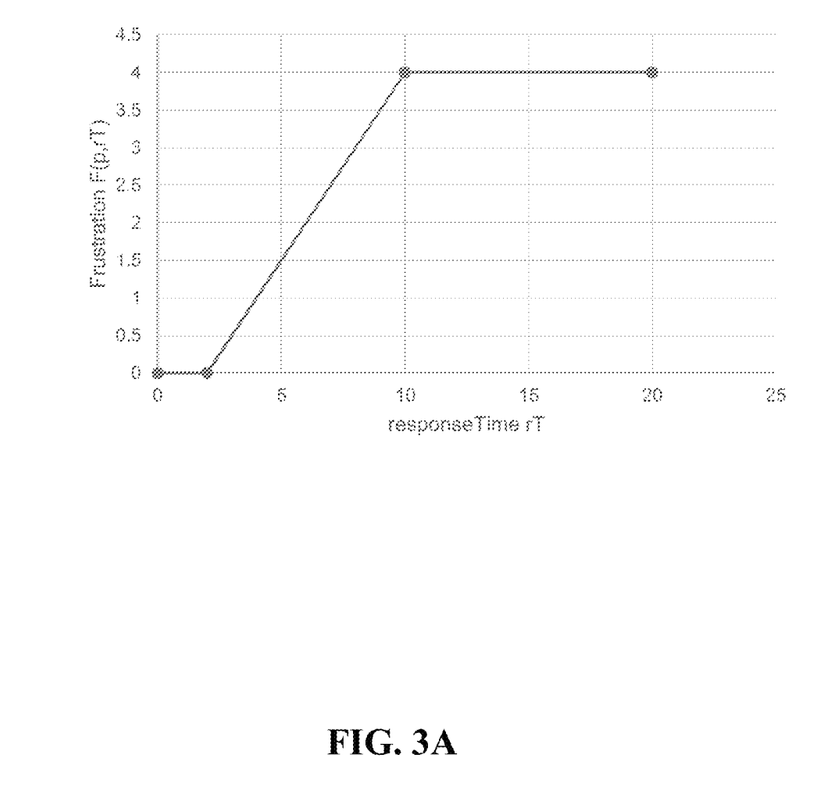
FIGS. 3A-B depict plots of frustration index versus response time, in accordance with some example embodiments.

FIG. 3A depicts an example plot of the frustration index versus response time in accordance with Equations 1-3 above. In FIG. 3A, $TR(p)=2$, while $MR(p)=10$.

Figure 3B:
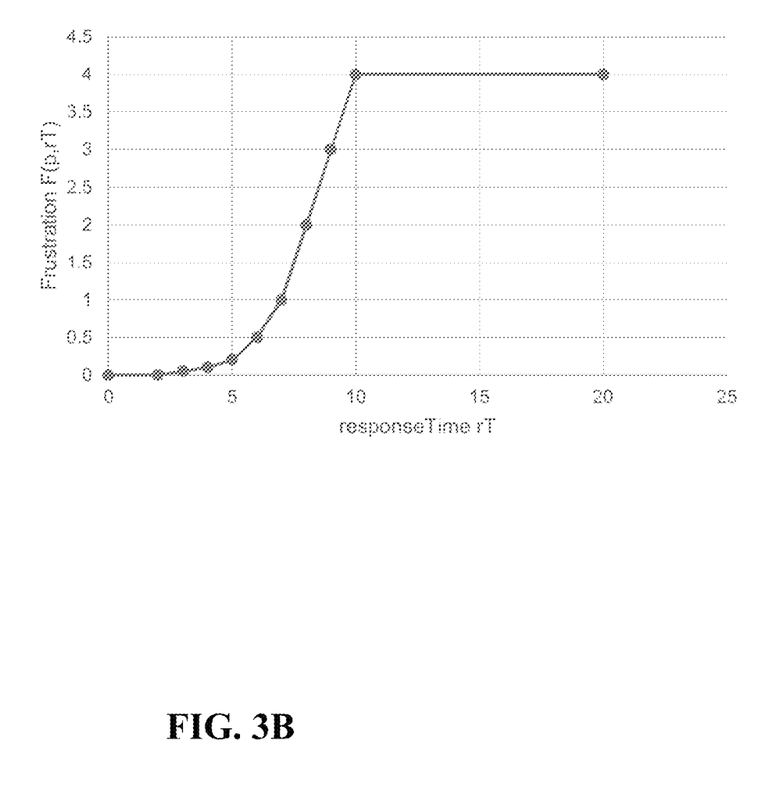

FIG. 3B depicts a variation of the determination of the frustration index. In the example of FIG. 3B, the frustration is weighted so that times closer to the target reflect less frustration, while those farther away from the target represent a greater degree of frustration. In this example, the frustration index is more likely to accurately represent the true frustration of the user as the user is likely to be marginally frustrated when the response time only exceeds the target response by a small, relative amount, but as the response time increases, the frustration increases more rapidly (see, for example, rT at 5). To that end, the frustration index may take into account a frustration override, FO(p, rT), for each element or page as follows:

If $rT<=TR(p)$

Then $F(p,rT)=0$      Equation 4.

If $rT>(TR(p)$ and $<MR(p))$

Then if $FO(p,rT)$ exist, $F(p,rt)=FO(p,rT)$

Else $F(p,rT)=(1/TR(p))*rT-1$      Equation 5.

If $rT>=MR(p)$

Then $F(p,rT)=MR(p)/TR(p)-1$      Equation 6.

In FIG. 3B, TR(p)=2, while MR(p)=10, given FO(p,rT)=1+(−0.63x)+(0.09x*x). Although the previous example described the frustration index generated based on response time, the frustration index may take into account other factors including error frequency, logout rate, and/or other navigational efficiency measures. For example, the frustration index may take into account a power user. The power user may be defined as a user who executes a significantly higher number of pages, so this power user may be more easily frustrated and thus have a lower tolerance for frustration. Moreover, functional measures may be implemented. For example, the frustration index for a given page may be enhanced to take into account other factors, such as amount or type of transaction, deadline, and/or the like. To illustrate, a user may have less tolerance for frustration for a page or pages associated with a small transaction, when compared to a larger one. Similarly, a user may have less tolerance for frustration for a page or pages associated with a transaction due immediate, when compared to a transaction that has a deadline a month later. The frustration index may also take into account, code regression. For example, if a page was faster before a software update, a user may have lower tolerance to delays caused by the update.

Moreover, if the response time is less than the target response but there were page errors, then there is some frustration as the user will need to re-execute another page or action. If a user executes a page that receives an error and subsequently revisits the same page to correct the error, then the response time may be calculated as the combined response time of both pages. The frustration indexer 152 may implement an error function, E(p), to calculate the amount of frustration experienced by users encountering errors on a given page. For example, if there is a page error, then response time is calculated as the sum of the response times for the page with the error and any subsequent attempts at the same page (which may include page(s) with errors and a page with the fulfilled response), as shown by Equations 7-10 below:

If $rT<=TR(p)$

Then If PageError $F(p,rT)=E(p)$

Else $F(p,rt)=0$      Equation 7.

If $rT>TR(p)$ and $<MR(p)$

Then if $FO(p,rT)$ exists and PageError $F(p,rt)=FO(p,rT)+E(p)$

Else if PageError $F(p,rT)=(1/TR(p))*rT-1+E(p)$

Else if $FO(p,rT)$ exists $F(p,rt)=FO(p,rT)$

Else $F(p,rT)=(1/TR(p))*rT-1$      Equation 8.

If $rT>=MR(p)$

Then If PageError $F(p,rT)=MR(p)/TR(p)-1+E(p)$

Else Error $F(p,rT)=MR(p)/TR(p)-1+E(p)$      Equation 9.

The frustration indexer 152 may also take into account groups of clicks that make up a so-called "clickstream." For example, suppose a user is attempting to create a requisition via a page presented at the user equipment and performs a catalog search for an item to be requisitioned. However, due to the content of the catalog, the user has trouble when searching and it takes 5 searches to find the item. Even though each search can be fast and below a target response time, the user will likely be frustrated by the repetition of actions. To take into account clickstream frustration, the frustration indexer 152 may determine the frustration index over a session corresponding to a clickstream. In some example embodiments, the click monitor 154 may pass a clickstream, c, that includes a page to the frustration indexer 152.

The click monitor 154 may monitor and log 158 each click in a clickstream. Each click may be stamped with meta-information describing the action. For example, when a user logs into an application, the click can be logged as "Page=Login." When the user clicks a button related to create a requisition, the click is logged as "Page=CreateRequisition" and this click is associated with a clickstream for create requisition, so the log would include "ClickStream=CreateReq." If the user as part of creating a requisition picks catalog item, the log would include "Page=PickCatalogItem" and this log would also indicate the clickstream as "ClickStream=CreateReq." If the user then enters accounting information for a line item, the log would include "Page=EnterAccounting," and this would also include the clickstream as "ClickStream=CreateReq." If the user submits requisition, the log would include that click as "Page=SubmitRequisition," and again the clickstream would show "ClickStream=CreateReq." Lastly, when the user returns to a home page or dashboard to perform another session, the log may include an entry indicating the end of the session, such as "Page=Dashboard," and "ClickStream=None." The logged clicks and metadata may thus allow system 100 to determine not only clicks but whether the clicks belong to a clickstream.

For any given page, the frustration indexer 152 may scan all other pages of the clickstream to see if the page is a repeat of a previously executed page. If so, frustration indexer 152 may sum the response times for the page and any similar, repeat pages to determine the frustration index, F(p,c,rT), for the clickstream in accordance with the following:

rT for a given page p=Sum of rT for all pages p within clickstream c

If $rT<=TR(p)$

Then If PageError $F(p,c,rT)=E(p)$

Else $F(p,rT)=0$      Equation 10.

If $rT>TR(p)$ and $<MR(p)$

Then if $FO(p,c,rT)$ exists and PageError $$F(p,rT)=FO(p,c,rT)+E(p)$$

Else if PageError $F(p,c,rT)=(1/TR(p))*rT-1+E(p)$

Else if $FO(p,c,rT)$ exists $F(p,c,rT)=FO(p,c,rT)$

Else $F(p,c,rT)=(1/TR(p))*rT-1$  Equation 11.

If $rT>=MR(p)$

Then If PageError $F(p,c,rT)=MR(p)/TR(p)-1+E(p)$

Else Error $F(p,c,rT)=MR(p)/TR(p)-1+E(p)$  Equation 12.

Figure 4:
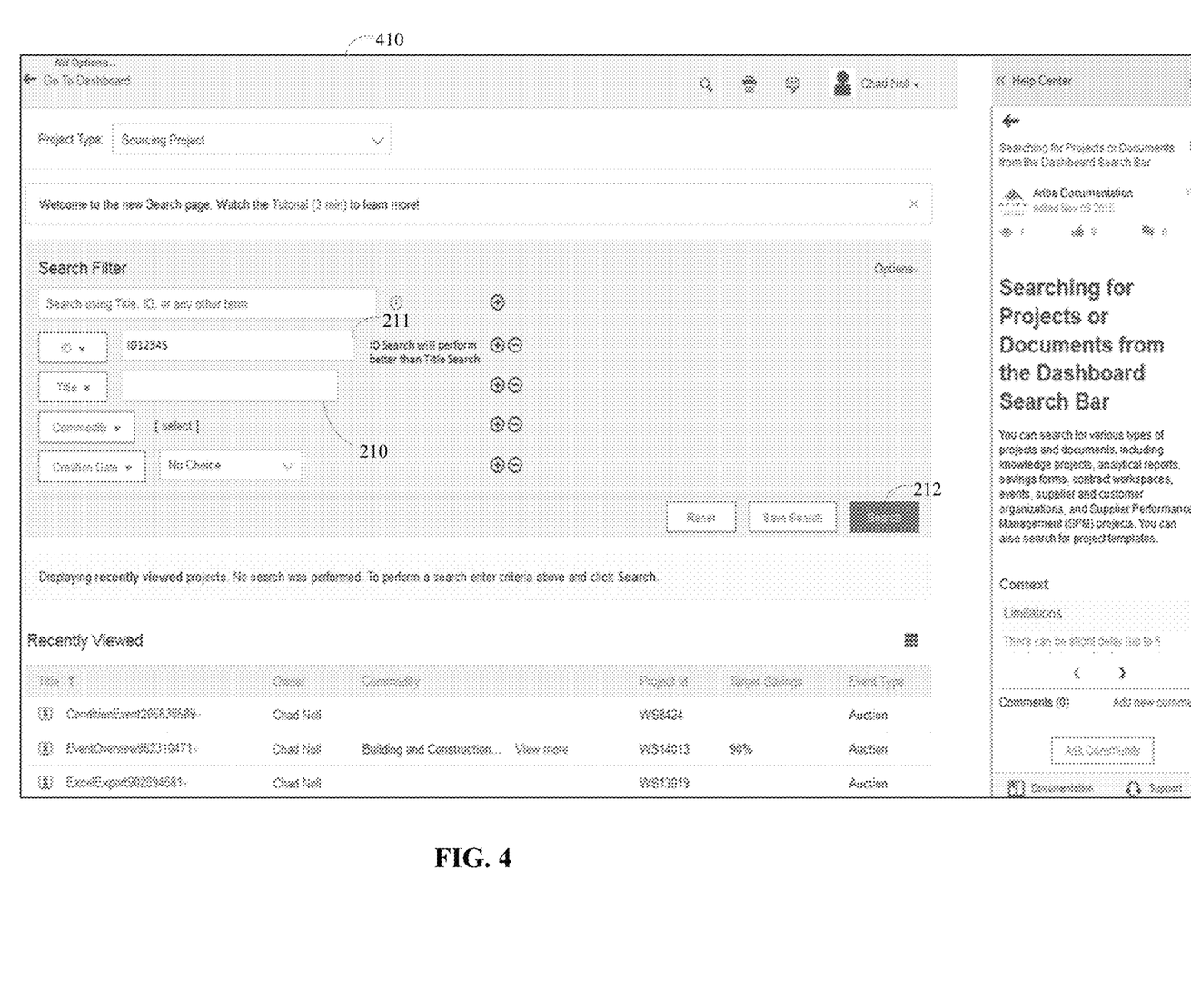
FIG. 4 depicts the user interface including the page of FIG. 2 adapted based on a frustration index, in accordance with some example embodiments.

In some example embodiments, the server 190 may also include an adaptation controller 156. The adaptation controller 156 may be configured to adapt, based on the frustration index, aspects of a page. For example, the adaptation controller may adapt a page (or an element of the page) so that it changes, such as reduces, the frustration index associated with that page. FIG. 4 depicts a page 410. Page 410 is similar to page 110 of FIG. 2, but at page 410, the adaptation controller 156 has adapted page 410 by changing the position of the ID field 211 and title field 210 as the adaptation controller 156 detects that based on the logged 158 frustration indexes, ID searches have a shorter response time when executed from field 211, when compared to execution at field 212. As part of the information collected via the click monitor, the system may capture information, such as what type of document the user is searching for, the exact search criteria including the values the user has specified for all search fields, and/or the like. This information (which may include other metadata collected by the system) may indicate which fields have an impact on a particular search query. As such, the adaptation controller 156 may thus reduce frustration index by placing ID field 211 above title field 211, so that the user is more likely to use field 211 when performing the ID search.

Figure 5:
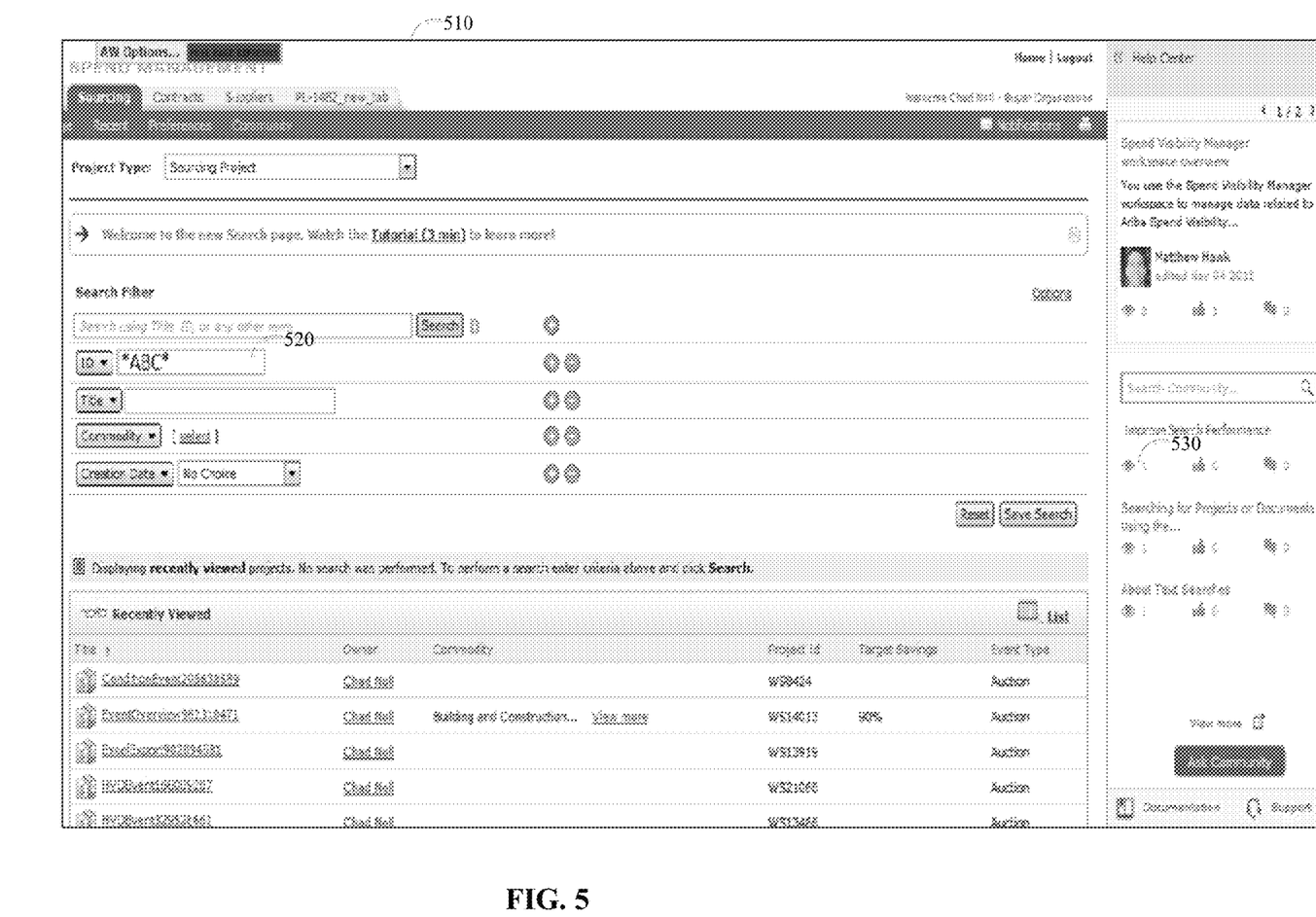
FIG. 5 depicts another example of a user interface including a page adapted based on a frustration index, in accordance with some example embodiments.

FIG. 5 depicts another example of adaptation of a user interface, in accordance with some example embodiments. In this example, the adaptation controller 156 has adapted page 510 by offering frustration index sensitive help. Specifically, the adaptation controller 156 detects, based on the logged 158 frustration indexes (or predefined rules), that performing a search using wildcards, such as "*ABC*" 520, may cause a response time that is longer than the target response time and thus cause a higher frustration index. As such, the adaptation controller 156 may adapt page generation to frustration index sensitive help 530. Selection of the icon at 530 may provide help that states consider performing the query without the wild cards.

Figure 6:
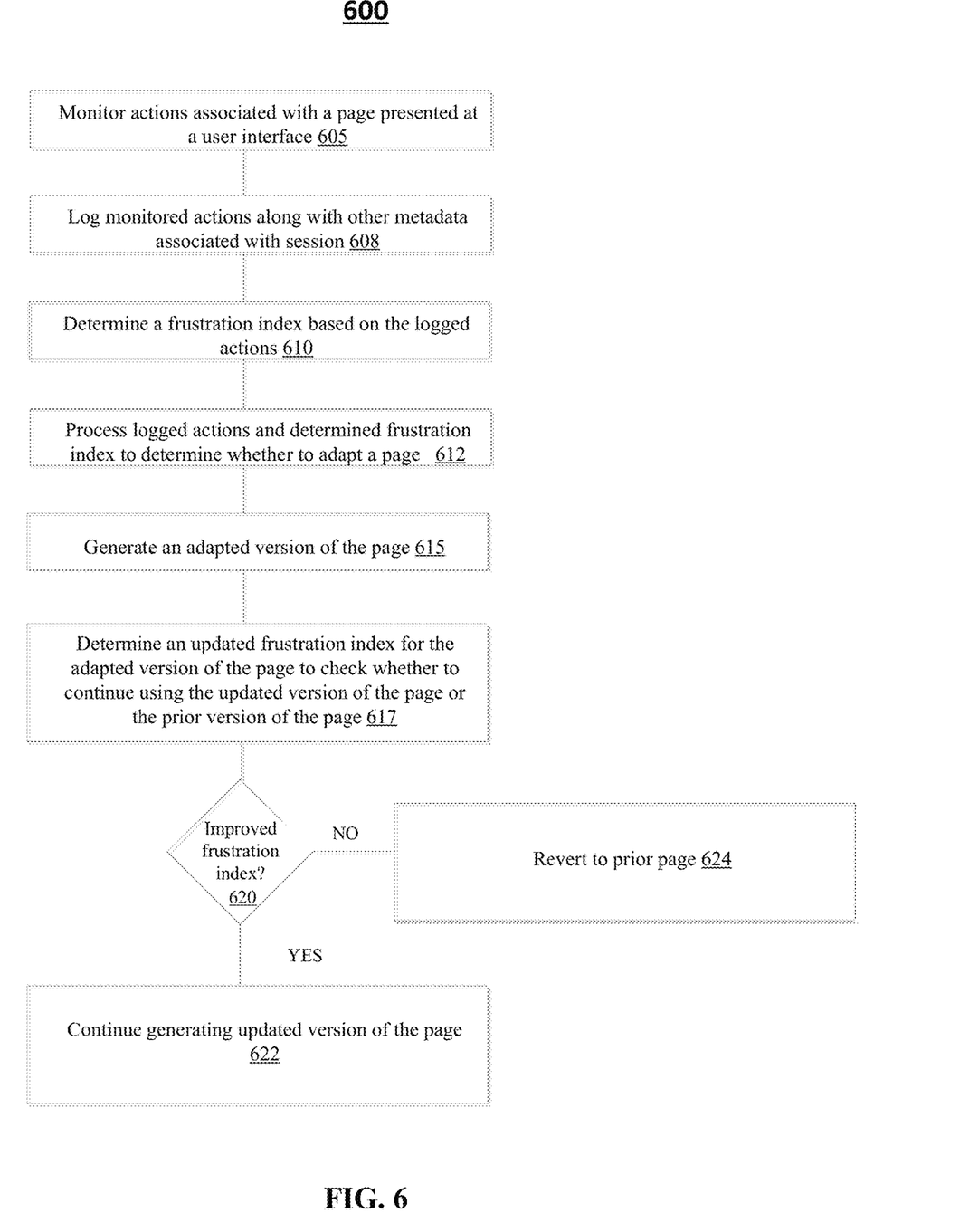
FIG. 6 depicts a process for user interface adaptation, in accordance with some example embodiments.

FIG. 6 depicts an example of a process 600 for user interface or page adaptation based on a frustration index, in accordance with some example embodiments. The description of process 600 also refers to FIG. 1.

At 605, one or more actions associated with a user interface including a page may be monitored. For example, click monitor 154 may monitor one or more actions such as clicks and the like performed at page 110.

At 608, the monitored actions may be logged along with other metadata. For example, click monitor 154 log at 158 the monitored actions. The click monitor 154 may log each action such as a click as a row in a database or other storage mechanism. Each row may include an identifier for the action, a response time (which indicates how long it took the cloud application to respond to the action at the page) for the action, and metadata associated with the action including user name, customer name, application node, browser error (if any), information about particular documents the user is using in a given action, and/or the like.

At 610, a frustration index may be determined based on the logged actions. For example, frustration indexer 152 may access for a given action a response time and determine, as described above, a frustration index for that action. The frustration indexer 152 may also log the determined frustration index value with that action (for example, as part of the same record or row). The frustration index may be determined for a single action or click, a clickstream, and over other types of sessions as well.

At 612, the logged actions for a page and the determined frustration index may be used to determine whether to adapt a page. For example, adaptation controller 156 may detect, from the logged information 118 for the pages and the frustration index information, that a given page may be adapted. For each adaptation that is defined, the system can establish a threshold as to when that adaptation would be triggered. For example, when searching for a purchase order, if the search criteria includes a title such as "ID %" then reorder the ID search field to the top of the list and suggest to the user to use ID search next time. When that is the case, adaptation controller 156 may generate, at 615, an adapted version of the page. Referring again to FIGS. 4 and 5, the adaptation controller 156 may generate an adapted user interface including a page having an element's location changed, offering frustration index based help, removing tiles, panes, features that are not beneficial to users due to performance frustration and/or altering configuration settings that change UI behavior (for example, increasing the pre-fetch size for those searches).

At 617, an updated frustration index may be determined for the adapted version of the user interface including page. The update frustration index may be used to determine whether the adapted user interface including page does indeed provide less frustration (as measured by the frustration index), when compared to the original, prior version of the page. If the frustration index of the adapted indicates an improvement, the adaptation controller may continue generating/using the adapted version of the user interface including page (yes at 620 and 622). However, if the frustration index of the adapted user interface/page does not reflect an improvement, the adaptation controller may revert to the prior user interface including page (no at 620 and 624).

The frustration indexer 152 may also take into account a broader user session associated with, as noted, a clickstream. The click monitor 154 may define that a group of clicks that include a specific function or activity, such as creating a requisition or reconciling an invoice, can be defined as a session corresponding to a clickstream. When this is the case, the frustration indexer 152 may determine the frustration index as a clickstream frustration index by at least summing the frustration indexes of each click (or action) that make up the clickstream (or by at least summing the response times of each click or action of the clickstream).

The frustration indexer 152 may also take into account a broader user session associated with, a so-called cloud stream. In cloud applications, a workflow of activities can be configured more broadly at the click monitor 154 to include a variety of applications (including third parties applications) in order to provide for example a workflow such as from generation a purchase requisition to actual order placement and to payment of the vendor. In this example, a group of clickstreams may be used to define the cloud stream. A clickstream may comprise a group of clicks that performs a single function such as creating a requisition, approving an invoice, and/or the like. A cloud stream is a group of clickstreams, such as the clickstream from create invoice, the clickstream approve invoice, the clickstream reconcile index, and the clickstream pay invoice. When this is the case, the frustration indexer 152 may determine the frustration index as cloud stream frustration index by at least summing the frustration indexes of each clickstream (or action) that make up the cloud stream (or by at least summing the response times of each).

The frustration index may be used to derive other indexes or indications of health of a cloud application(s). For example, a cloud health index may be generated for one or more applications, such as cloud application 150, based on determined frustration indexes. To illustrate further, a health index may be determined as follows:

$$\text{Cloud Health} = \text{MAX}(100 - (\text{Frustration}/\text{Total Number of Pages} * 100), 0) \qquad \text{Equation 13.}$$

Figure 7:
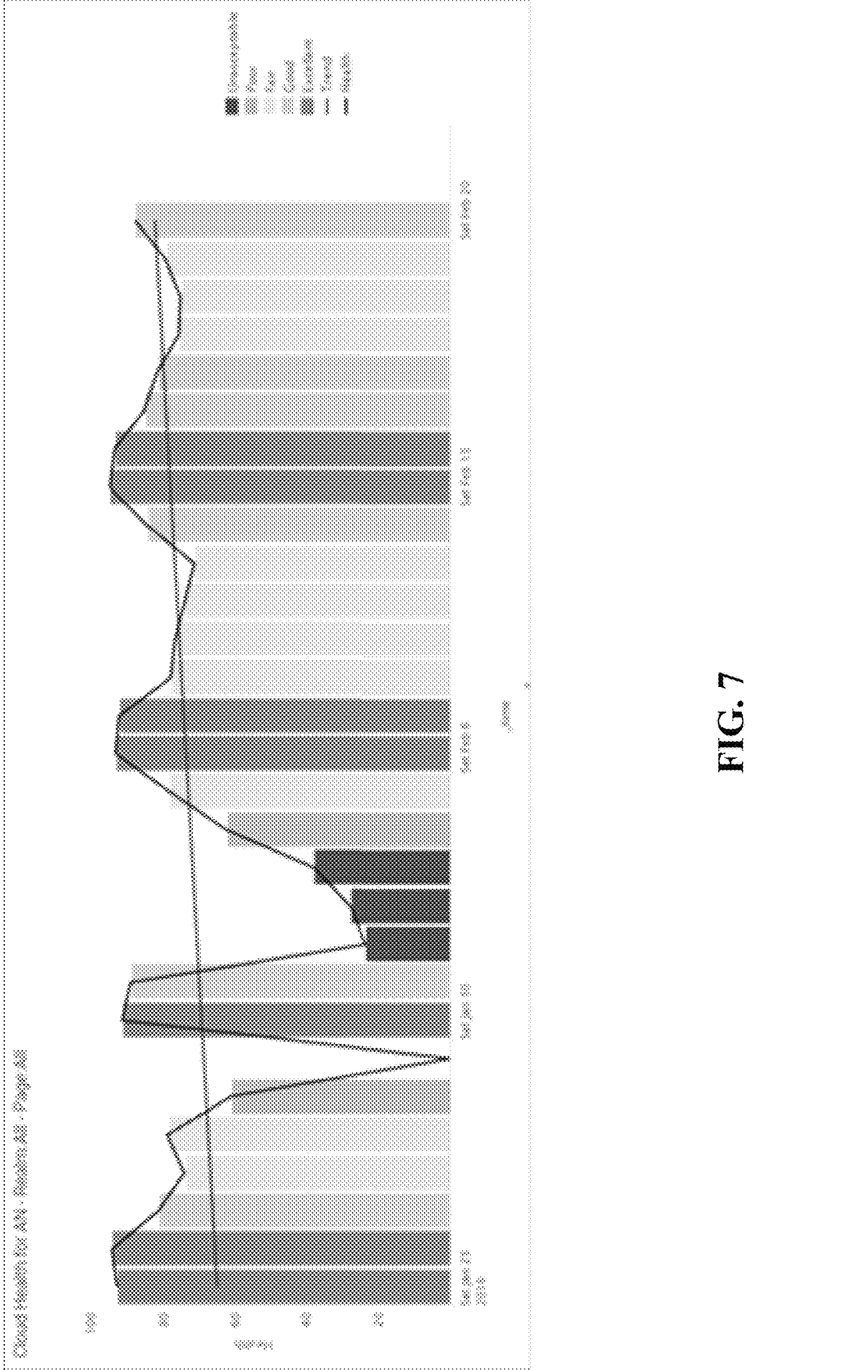
FIG. 7 depicts an example of a cloud health index generated based on frustration indexes, in accordance with some example embodiments Like labels are used to refer to same or similar items in the drawings.

In some implementation, the health index is a normalized value between 0 and 100 that represents how healthy a given application is performing. The frustration value in Equation 13 varies based on the number of pages a user executes. For example, a score of 70 for the health index means that 30% of a user's time was wasted on slow pages, or the 70 score can also be viewed in terms of productivity (for example, the user could have accomplished 30% more pages in the time wasted). In this example, the cloud health can be mapped into levels, such as 100-90 which may represent excellent performance, 80-90 which may represent good performance, 65-80 which may indicate fair performance, and so forth, although other range of levels may be implemented as well. This can be tracked over time as shown at FIG. 7 to show cloud application health over time.

Without in any way limiting the scope, interpretation, or application of the claims appearing herein, a technical effect of one or more of the example embodiments disclosed herein may include generating user interfaces including pages that provide quicker responses from a cloud based application.

Although some of the examples above refer to a frustration index determined as a specific index, the frustration index may take other forms that indicate frustration (or lack of productivity) at a given page as a function of at least the response time and/or the like. Moreover, although some of the examples above refer to a lower frustration index value having a lower relative frustration, a lower frustration index value may also be generated that represents a higher relative frustration determined when compared to higher frustration index value.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (for example, a mouse or a trackball) by which the user may provide input to the computer. Other kinds of devices may be used to provide for interaction with a user as well; for example, feedback provided to the user may be any form of sensory feedback (for example, visual feedback, auditory feedback, or tactile feedback); and input from the user may be received in any form, including acoustic, speech, or tactile input.

The subject matter described herein may be implemented in a computing system that includes a back-end component (for example, as a data server), or that includes a middleware component (for example, an application server), or that includes a front-end component (for example, a client computer having a graphical user interface or a Web browser through which a user may interact with an implementation of the subject matter described herein), or any combination of such back-end, middleware, or front-end components. The components of the system may be interconnected by any form or medium of digital data communication (for example, a communication network). Examples of communication networks include a local area network ("LAN"), a wide area network ("WAN"), and the Internet.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (for example, magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein does not require the particular order shown, or sequential order, to achieve desirable results. In addition, other processing attributes other than threads can be used to determine whether to selectively change the speed of a core scheduled to process the corresponding tasks. Moreover, the term task can be construed, unless explicitly stated otherwise, to include jobs and other broader groupings of related computing activities. Other embodiments may be within the scope of the following claims.

What is claimed:

1. A method comprising:
monitoring a response time associated with at least one action on at least one user interface element of a page presented at a user interface, the response time representative of an amount of time for a cloud-based application to respond to the at least one action at the user interface element, the cloud-based application being remote from the at least one user interface element of the page;
determining, based on at least the response time representative of the amount of time for the cloud-based application to respond to the at least one action, a frustration index, wherein when the response time for the cloud-based application to respond to the at least one action is higher than a target response time, the frustration index is higher when compared to when the response time is lower than the target response time; and
adapting, based on the determined frustration index being higher than a threshold frustration index corresponding to the target response time, at least a portion of the user interface including the page by at least moving a positon of the at least one user interface element to another location on the page, wherein the other location is below another user interface element having a lower corresponding frustration index than the determined frustration index for the at least one user interface element.

2. The method of claim 1, wherein the page is presented at a user equipment which accesses via a network the cloud-based application hosted by at least one server, and wherein the at least one user interface element causes a query to be sent to the cloud-based application.

3. The method of claim 1 further comprising:
logging, by at least one server including a click monitor, the monitored at least one action.

4. The method of claim 3, wherein the at least one action is logged with an associated response time.

5. The method of claim 4, wherein the response time is determined based on a timer that is triggered when the at least one action is received by the click monitor.

6. The method of claim 1, wherein the adapting comprises providing help information at the page, the help information enabling a change in the response time and the frustration index.

7. The method of claim 1, wherein the at least one action comprises a click.

8. The method of claim 1 further comprising:
determining the frustration index over a plurality of actions.

9. The method of claim 1 further comprising:
determining an application health index based on the frustration index and a quantity of pages executed, wherein the application health function is scaled between 0 and 100.

10. The method of claim 1, wherein the cloud based application monitors the response time associated with at least one action, determines the frustration index, and adapts at least the portion of the user interface including the page.

11. The method of claim 1, wherein the determining further comprises:
determining the response time over the page and a second page, when the first page causes an error in response to which the second page is presented to correct the error.

12. A system comprising:
at least one processor; and
at least one memory including program code, which when executed causes operations comprising:
monitoring a response time associated with at least one action on at least one user interface element of a page presented at a user interface, the response time representative of an amount of time for a cloud-based application to respond to the at least one action at the user interface element, the cloud-based application being remote from the at least one user interface element of the page;
determining, based on at least the response time representative of the amount of time for the cloud-based application to respond to the at least one action, a frustration index, wherein when the response time for the cloud-based application to respond to the at least one action is higher than a target response time, the frustration index is higher when compared to when the response time is lower than the target response time; and
adapting, based on the determined frustration index being higher than a threshold frustration index corresponding to the target response time, at least a portion of the user interface including the page by at least moving a positon of the at least one user interface element to another location on the page, wherein the other location is below another user interface element having a lower corresponding frustration index than the determined frustration index for the at least one user interface element.

13. The system of claim 12, wherein the page is presented at a user equipment which accesses via a network the cloud-based application hosted by at least one server, and wherein the at least one user interface element causes a query to be sent to the cloud-based application.

14. The system of claim 12, further comprising:
logging, by at least one server including a click monitor, the monitored at least one action.

15. The system of claim 14, wherein the at least one action is logged with an associated response time.

16. The system of claim 15, wherein the response time is determined based on a timer that is triggered when the at least one action is received by the click monitor.

17. The system of claim 12, wherein the adapting comprises providing help information at the page, the help information enabling a change in the response time and the frustration index.

18. The system of claim 12, wherein the at least one action comprises a click.

19. The system of claim 12 further comprising:
determining the frustration index over a plurality of actions.

20. The system of claim 12 further comprising:
determining an application health index based on the frustration index and a quantity of pages executed, wherein the application health function is scaled between 0 and 100.

21. A non-transitory computer-readable storage medium including program code which when executed causes operations comprising:
monitoring a response time associated with at least one action on at least one user interface element of a page presented at a user interface, the response time representative of an amount of time for a cloud-based application to respond to the at least one action at the user interface element, the cloud-based application being remote from the at least one user interface element of the page;
determining, based on at least the response time representative of the amount of time for the cloud-based application to respond to the at least one action, a frustration index, wherein when the response time for the cloud-based application to respond to the at least one action is higher than a target response time, the frustration index is higher when compared to when the response time is lower than the target response time; and
adapting, based on the determined frustration index being higher than a threshold frustration index corresponding to the target response time, at least a portion of the user interface including the page by at least moving a positon of the at least one user interface element to another location on the page, wherein the other location is below another user interface element having a lower corresponding frustration index than the determined frustration index for the at least one user interface element.

* * * * *